United States Patent
Inagaki et al.

(10) Patent No.: US 11,055,499 B2
(45) Date of Patent: Jul. 6, 2021

(54) CARD DEVICE, HOST DEVICE, AND COMMUNICATION METHOD

(71) Applicant: PANASONIC INTELLECTUAL PROPERTY MANAGEMENT CO., LTD., Osaka (JP)

(72) Inventors: Yoshihisa Inagaki, Hyogo (JP); Tadashi Ono, Osaka (JP); Isao Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/738,919

(22) Filed: Jan. 9, 2020

(65) Prior Publication Data
US 2020/0143118 A1    May 7, 2020

Related U.S. Application Data

(63) Continuation of application No. PCT/JP2018/028522, filed on Jul. 31, 2018.

(30) Foreign Application Priority Data

Aug. 8, 2017    (JP) .............................. JP2017-153374

(51) Int. Cl.
*G06K 19/06*    (2006.01)
*G06K 7/00*    (2006.01)

(52) U.S. Cl.
CPC ......... *G06K 7/0052* (2013.01); *G06K 7/0021* (2013.01); *G06K 7/0069* (2013.01)

(58) Field of Classification Search
CPC ... G06K 7/0052; G06K 7/0021; G06K 7/0069

USPC ......................................................... 235/492
See application file for complete search history.

(56) References Cited

U.S. PATENT DOCUMENTS

| | | | |
|---|---|---|---|
| 8,943,226 B1 * | 1/2015 | Hoglund | G06F 3/0659 710/5 |
| 9,946,681 B1 * | 4/2018 | Jenkins | G06F 13/387 |
| 10,509,759 B2 * | 12/2019 | Willis | G06F 13/4291 |
| 2005/0182881 A1 | 8/2005 | Chou et al. | |
| 2007/0051806 A1 | 3/2007 | Fujimoto | |
| 2012/0159030 A1 | 6/2012 | Huomo et al. | |
| 2020/0034317 A1 * | 1/2020 | Kato | G06K 7/00 |
| 2020/0233812 A1 * | 7/2020 | Oh | G06F 12/1009 |

FOREIGN PATENT DOCUMENTS

| | | |
|---|---|---|
| JP | 2007-188325 A | 7/2007 |
| JP | 2008-097308 A | 4/2008 |
| WO | 2006/057340 A1 | 6/2006 |

OTHER PUBLICATIONS

International Search Report and Written Opinion issued in International Patent Application No. PCT/JP2018/028522, dated Oct. 30, 2018; with partial English translation.

* cited by examiner

*Primary Examiner* — Ahshik Kim
(74) *Attorney, Agent, or Firm* — McDermott Will and Emery LLP

(57) ABSTRACT

A card device according to an aspect of the present disclosure includes: a first interface that connects the card device with a host device. The card device notifies, through the first interface, the host device of whether or not the card device includes a second interface different from the first interface.

10 Claims, 17 Drawing Sheets

FIG. 9

INTERFACE-FLAG-FOR-IDENTIFICATION-OF-AN-INTERFACE 413

OO_OO_OO_OO   RIGHT ONE BIT (WHETHER OR NOT CARD DEVICE INCLUDES)   0: NOT INCLUDE   1: INCLUDES
                LEFT ONE BIT (VERSION)                              0: VERSION 1     1: VERSION 2

M-PHY  USB  UHSII  PCIe

FIG. 12

PROTOCOL FLAG

0 : CARD DEVICE DOES NOT IMPLEMENT NVMe
   1 : CARD DEVICE IMPLEMENTS NVMe

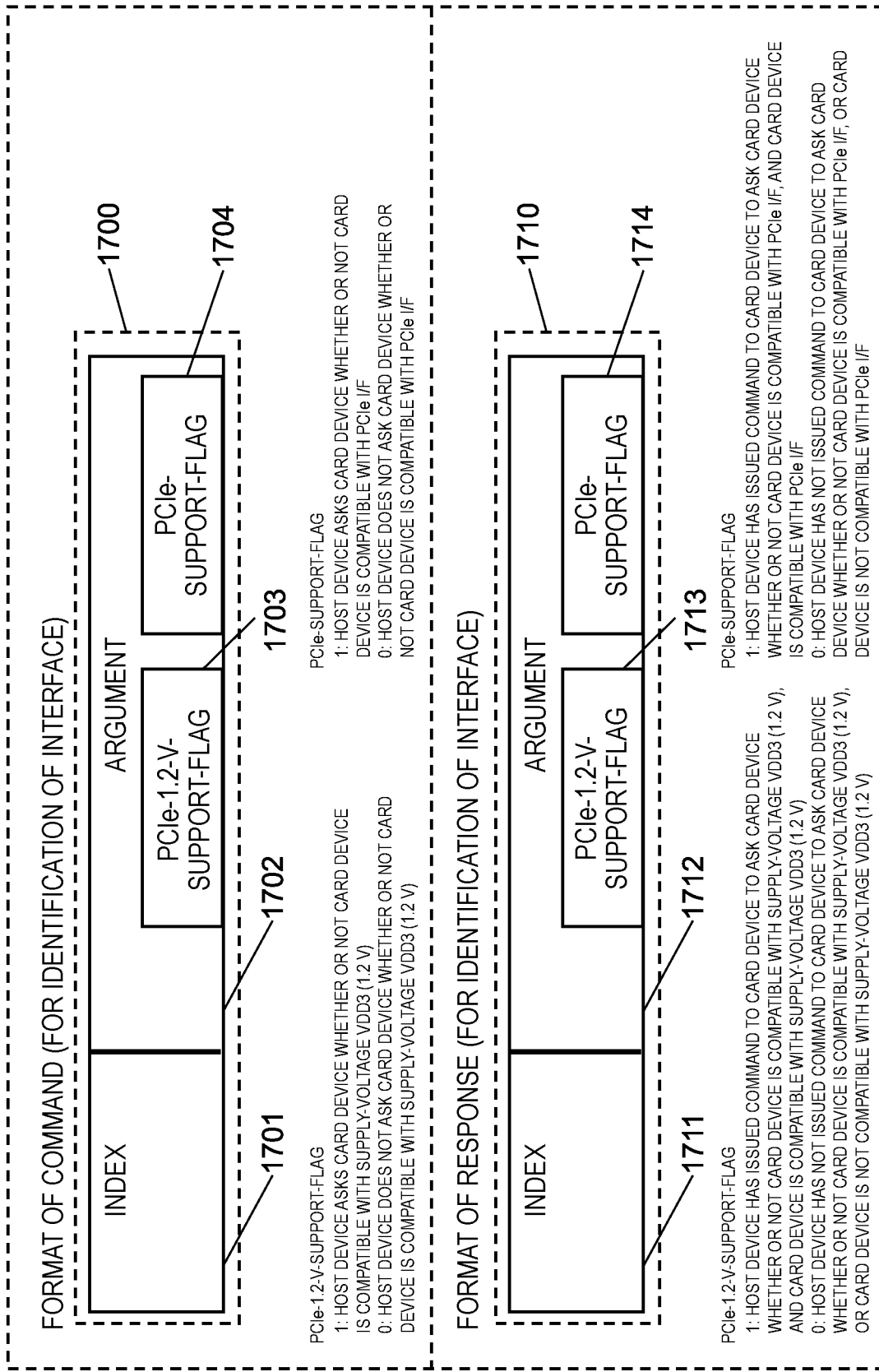

CARD DEVICE, HOST DEVICE, AND COMMUNICATION METHOD

CROSS-REFERENCE OF RELATED APPLICATIONS

This application is a U.S. Continuation application of International Patent Application No. PCT/JP2018/028522, filed on Jul. 31, 2018, which in turn claims the benefit of Japanese Application No. 2017-153374, filed on Aug. 8, 2017, the entire disclosures of which Applications are incorporated by reference herein.

BACKGROUND

1. Technical Field

The present disclosure relates to a card device and a host device that can be connected with each other.

2. Description of the Related Art

In recent years, card devices are common in markets. The card devices each include a high-capacity nonvolatile storage element, such as a flash memory, and processes data at high speed. For example, the card devices include secure digital (SD) cards that have a shape like a card, and memory sticks. When such a card device is used, the card device is mounted on a host device, such as a personal computer, a smartphone, a digital camera, an audio player, and a car navigation system.

SD cards are a kind of the card devices. Some of SD cards support a single-ended interface (a legacy interface, or a low-voltage (LV) interface). Some of SD cards support an Ultra High Speed II (UHS-II) interface. Differential signaling is used for the UHS-II interface to increase a transfer speed. Further, it is desirable to introduce new interfaces into SD cards. For example, the new interfaces include Peripheral Component Interconnect Express (PCIe) (registered trademark), and Universal Serial Bus (USB).

PTL (Patent Literature) 1 is WO 2006/057340 A.

SUMMARY

However, if an interface that is newly introduced into a card device connects the card device with a host device, it is difficult for the host device to identify the interface that connects the card device with the host device. The present disclosure is made in view of the above problem. The present disclosure provides a card device and a host device that allow the host device to easily determine whether or not an interface that is newly introduced into the card device connects the card device with the host device.

Further, if a card device implements a plurality of protocols that each depend on an interface, a host device needs to identify the protocols implemented on the card device. The present disclosure is also made in view of the above problem. The present disclosure provides a card device and a host device that identify protocols implemented on the card device.

A card device according to an aspect of the present disclosure includes a first interface that connects the card device with a host device. The card device notifies, through the first interface, the host device whether or not the card device includes a second interface different from the first interface.

A host device according to another aspect of the present disclosure includes a first interface that connects the host device with a card device. The host device asks, through the first interface, the card device whether or not the card device includes a second interface different from the first interface.

A communication method according to another aspect of the present disclosure is a communication method performed by a host device connected with a card device through a first interface. The communication method includes an inquiry step to ask, through the first interface, the card device whether or not the card device includes a second interface different from the first interface, and a receiving step to receive, from the card device through the first interface, whether or not the card device includes the second interface.

The present disclosure allows a host device to easily determine whether or not an interface that is newly introduced into a card device connects the card device with the host device.

BRIEF DESCRIPTION OF DRAWINGS

FIG. 9 illustrates an interface flag for a plurality of interfaces according to the second exemplary embodiment.

FIG. 12 illustrates a protocol flag at a time when an SD protocol is implemented, according to the third exemplary embodiment.

FIG. 17 illustrates a command-for-identification-of-an-interface and a response-for-identification-of-an-interface according to the fourth exemplary embodiment.

DETAILED DESCRIPTION

Hereinafter, exemplary embodiments will be described in detail with reference to the drawings as appropriate. In some cases, however, the exemplary embodiments may not be described unnecessarily in detail. For example, well-known matters may not be described in detail. Further, if a configuration is substantially same as a configuration that has been described, the configuration may not be described. Consequently, the following description is not unnecessarily wordy, and thus is easily understood by a person skilled in the art.

The accompanying drawings and the following description are provided to allow a person skilled in the art to sufficiently understand the present disclosure. It is not intended that the accompanying drawings and the following description limit claimed subject.

First Exemplary Embodiment

[1-1. Operation]

Figure 1:
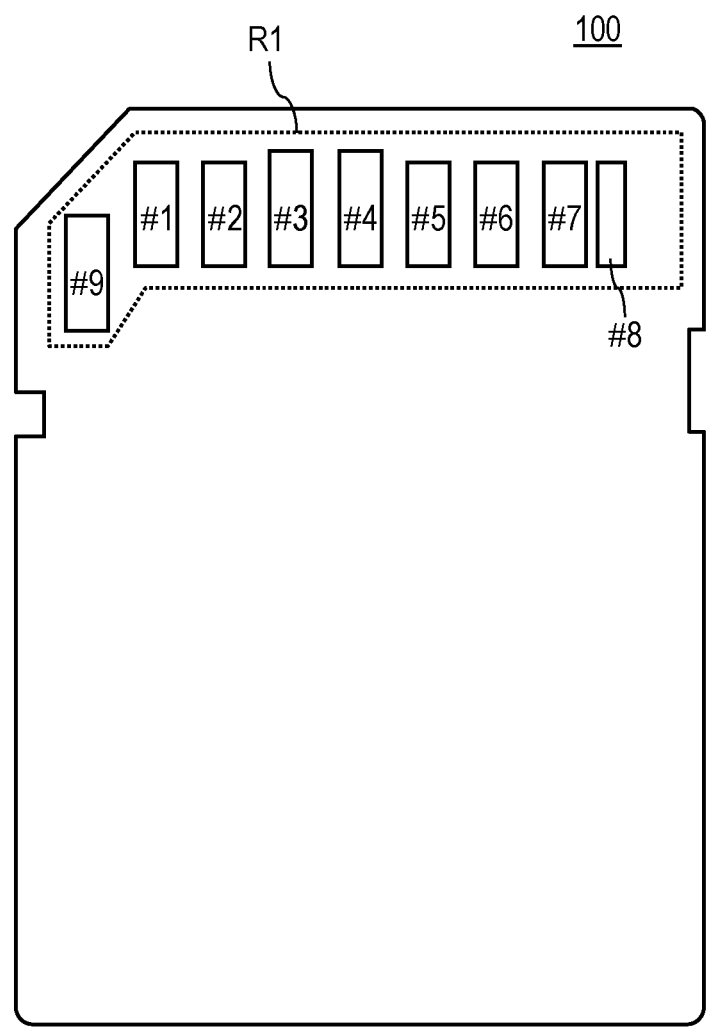
FIG. 1 illustrates an example of pin assignment of an interface of a card device.

FIG. 1 illustrates pin assignment of an interface of card device 100.

Card device 100 is an SD card that is compatible with a standard of a 3.3 V/1.8 V single-ended interface (hereinafter abbreviated to a legacy I/F).

Card device 100 includes a group-of-pins R1 that includes pins #1 to #9. Group-of-pins R1 constitutes a legacy I/F that connects card device 100 with a host device.

Figure 2:
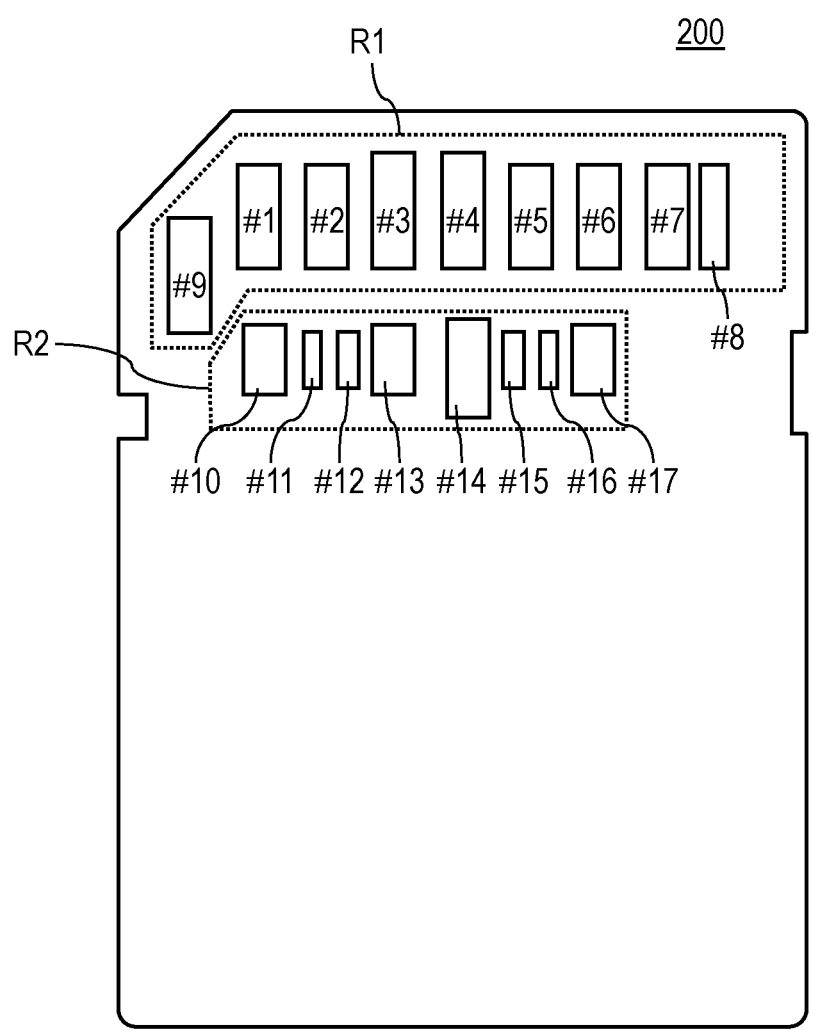
FIG. 2 illustrates an example of pin assignment of an interface of a card device.

FIG. 2 illustrates pin assignment of an interface of card device 200.

Card device 200 is an SD card that is compatible with the standard of the legacy I/F and is compatible with a new interface.

In the present exemplary embodiment, the new interface is a PCIe interface (hereinafter abbreviated to a PCIe I/F). Further, an interface may be abbreviated to an I/F.

Card device 200 includes group-of-pins R1. Group-of-pins R1 includes pins #1 to #9 and constitutes a legacy I/F that connects card device 200 with a host device. Card device 200 also includes group-of-pins R2. Group-of-pins R2 includes pins #10 to #17 and constitutes a PCIe I/F that connects card device 200 with the host device.

Figure 3:
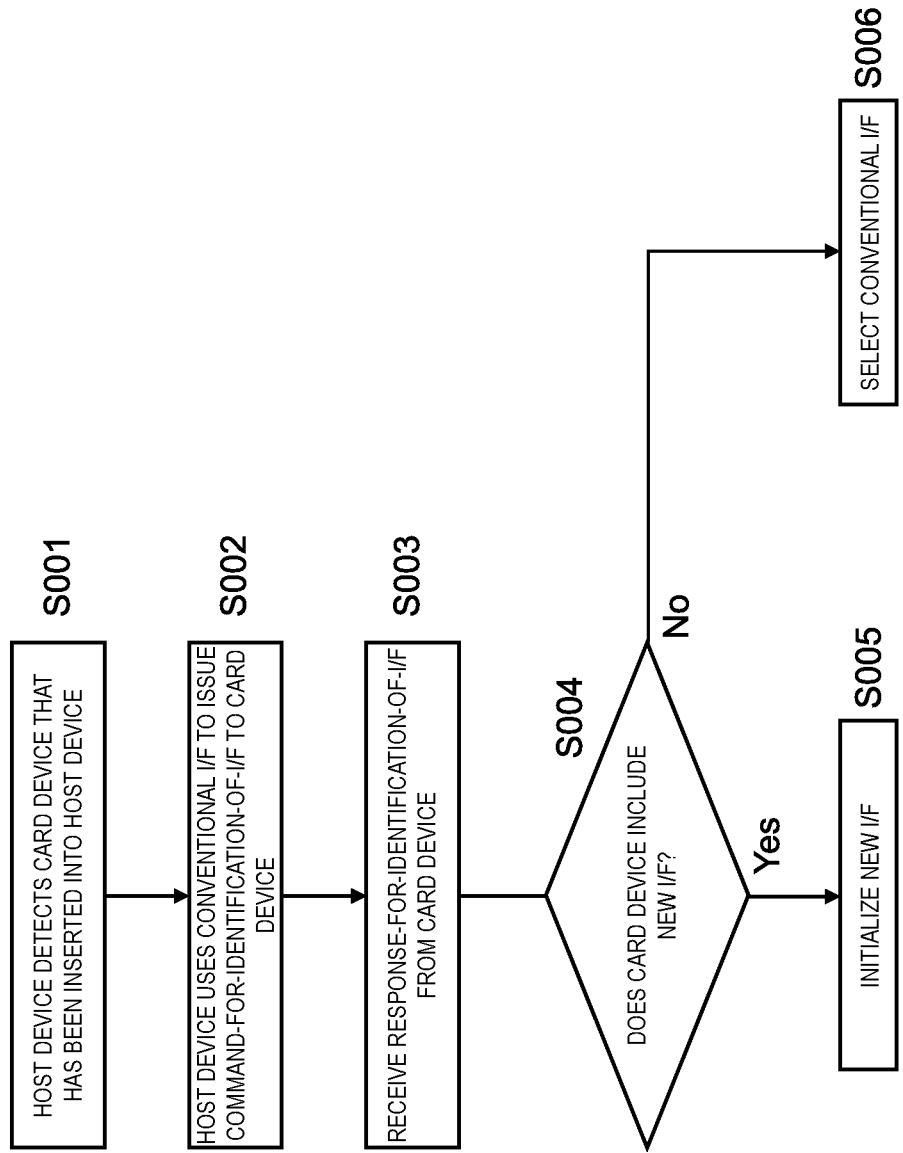
FIG. 3 is a flowchart that illustrates an example of a process of selection of interfaces according to a first exemplary embodiment.

FIG. 3 is a flowchart that illustrates an example of a process of selection of interfaces.

Operations illustrated in FIG. 3 are a process performed by the host device. The host device stores, in a storage device such as a memory, program used for the process of selection of interfaces. The process of selection of interfaces is performed by a controller that executes the program. The controller includes a central processing unit (CPU).

First, the host device detects card device X that has been inserted into the host device (step S001). Card device X is detected by a mechanism of a connector for a card device, for example. The connector for a card device is in the host device.

Card device X is a card device that can be inserted into the connector for a card device. In the present exemplary embodiment, card device X is card device 100 or card device 200.

Next, to determine whether card device X that has been inserted into the host device is card device 100 or card device 200 that includes a new interface, the host device uses the legacy I/F to issue a command-for-identification-of-an-interface to the card device (step S002). The legacy I/F is a conventional I/F that card device 100 and card device 200 each include. That is, the host device uses the command-for-identification-of-an-interface to ask the card device whether or not the card device includes the PCIe I/F.

Next, the host device receives, from card device X, a response-for-identification-of-an-interface (step S003). The response-for-identification-of-an-interface corresponds to the command-for-identification-of-an-interface. The command-for-identification-of-an-interface and the response-for-identification-of-an-interface will be described later.

Next, based on the response-for-identification-of-an-interface, the host device determines whether or not card device X includes the PCIe I/F (step S004). That is, the card device transmits, to the host device through the legacy I/F, the response-for-identification-of-an-interface. Consequently, the card device notifies the host device of a fact that the card device includes or does not include the PCIe I/F.

If card device X includes the PCIe I/F (Yes in step S004), the host device determines that card device X that has been inserted into the host device is card device 200. Then the host device initializes the PCIe I/F (step S005). The initialization of the PCIe I/F completes link training, for example, and allows transmission and reception of transaction layer packets (TLPs) of a transaction layer.

Next, if card device X does not include the PCIe I/F (No in step S004), the host device determines that card device X that has been inserted into the host device is card device 100. Then the host device selects the legacy I/F that is a conventional I/F (step S006).

As long as card device X has not transmitted, to the host device, the response-for-identification-of-an-interface, the host device may determine that the host device has not been notified of a fact that the card device X includes or does not include the PCIe I/F, and card device X may not allow the host device to initialize the PCIe I/F.

The new interface is not limited to the PCIe I/F. The new interface may be another interface, such as Universal Serial Bus (USB).

The response-for-identification-of-an-interface may contain information about a value of voltage that is able to be applied to card device X by the host device. Based on the value, the host device may change a voltage that the host device applies to card device X.

[1-2. Command-for-Identification-of-Interface and Response-for-Identification-of-Interface]

Figure 4:
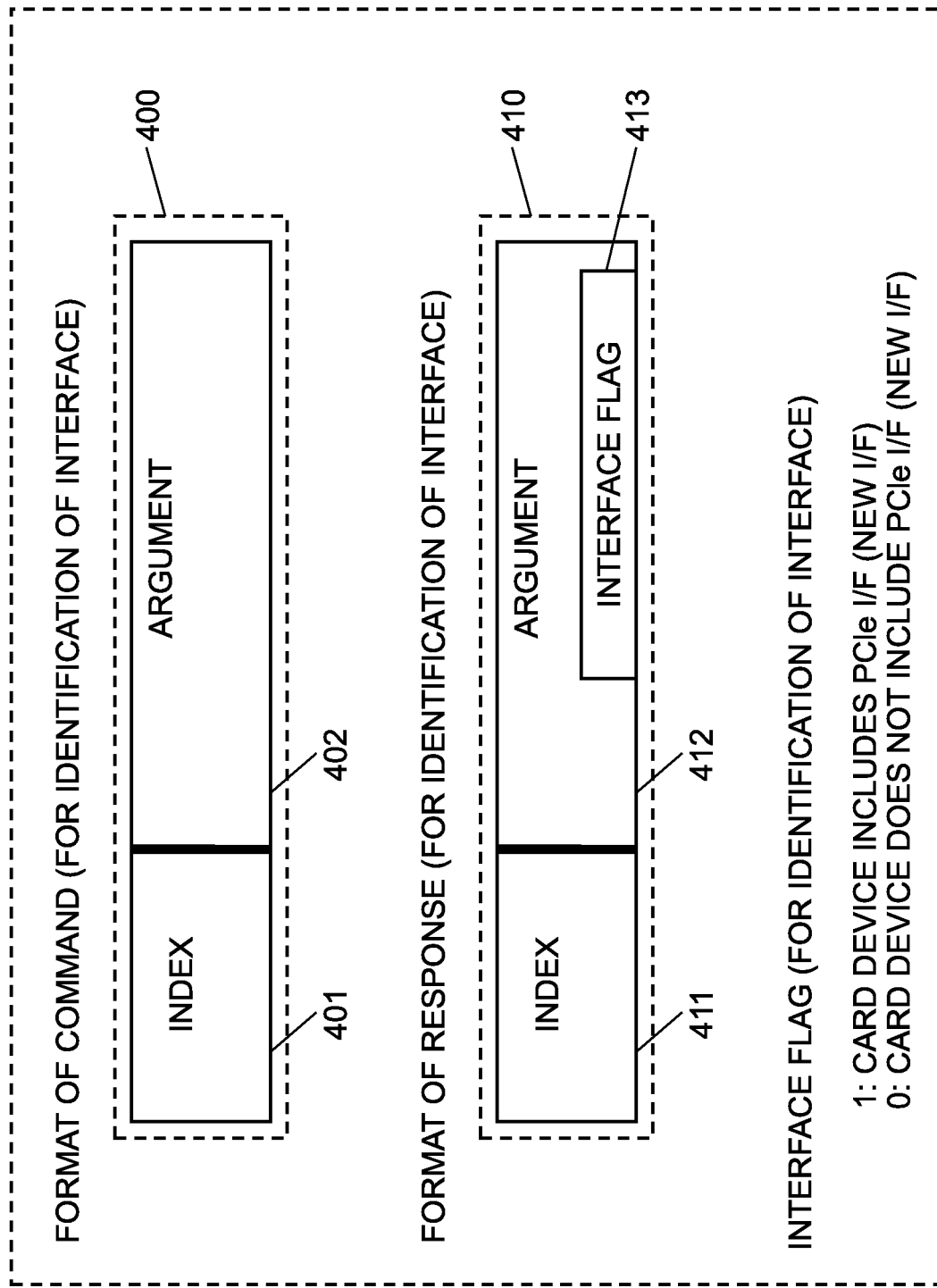
FIG. 4 illustrates a command-for-identification-of-an-interface and a response-for-identification-of-an-interface according to the first exemplary embodiment.

FIG. 4 illustrates format-of-a-command-for-identification-of-an-interface 400 and format-of-a-response-for-identification-of-an-interface 410.

Format-of-a-command-for-identification-of-an-interface 400 includes index-of-a-command-for-identification-of-an-interface 401 and argument-of-a-command-for-identification-of-an-interface 402. The card device uses index-of-a-command-for-identification-of-an-interface 401 to determine whether or not a command issued by the host device is the command-for-identification-of-an-interface.

Format-of-a-response-for-identification-of-an-interface 410 includes index-of-a-response-for-identification-of-an-interface 411 and argument-of-a-response-for-identification-of-an-interface 412. The card device transmits, to the host device, index-of-a-response-for-identification-of-an-interface 411 that has a value that is equal to a value of index-of-a-command-for-identification-of-an-interface 401 contained in the command-for-identification-of-an-interface. The host device uses index-of-a-response-for-identification-of-an-interface 411 to determine whether or not a response transmitted from the card device is the response-for-identification-of-an-interface. Argument-of-a-response-for-identification-of-an-interface 412 contains interface-flag-for-identification-of-an-interface 413. If a card device includes the PCIe I/F, interface-flag-for-identification-of-an-interface 413 is "one". If a card device does not include the PCIe I/F, interface-flag-for-identification-of-an-interface 413 is "zero".

FIG. 9 illustrates an example of interface-flag-for-identification-of-an-interface 413 in a case where a card device includes a plurality of interfaces that can be selected. A zero bit represents whether or not a card device includes PCIe. A first bit represents a version of the PCIe. A second bit represents whether or not a card device includes UHS-II. A third bit represents a version of the UHS-II. A fourth bit represents whether or not a card device includes USB. A fifth bit represents a version of the USB. A sixth bit represents whether or not a card device includes M-PHY. A seventh bit represents a version of the M-PHY. For example, if interface-flag-for-identification-of-an-interface 413 is "00_00_11_00", a card device includes UHS-II, and a version of the UHS-II is version 2.

In the example, eight bits are used to identify four kinds of interfaces and identify two versions of each of the interfaces. However, combinations of a number of bits, kinds of interfaces, and a number of versions are not limited to the example. M-PHY, USB, UHS-II, and PCIe are exemplified as kinds of interfaces. However, other interfaces may be used.

[1-3. Effects and Others]

In the present exemplary embodiment, a host device uses a legacy I/F that is a conventional I/F to identify an interface of a card device that has been inserted into the host device, as described above. Consequently, the host device can select an appropriate interface.

Second Exemplary Embodiment

[2-1. Operation]

Figure 5:
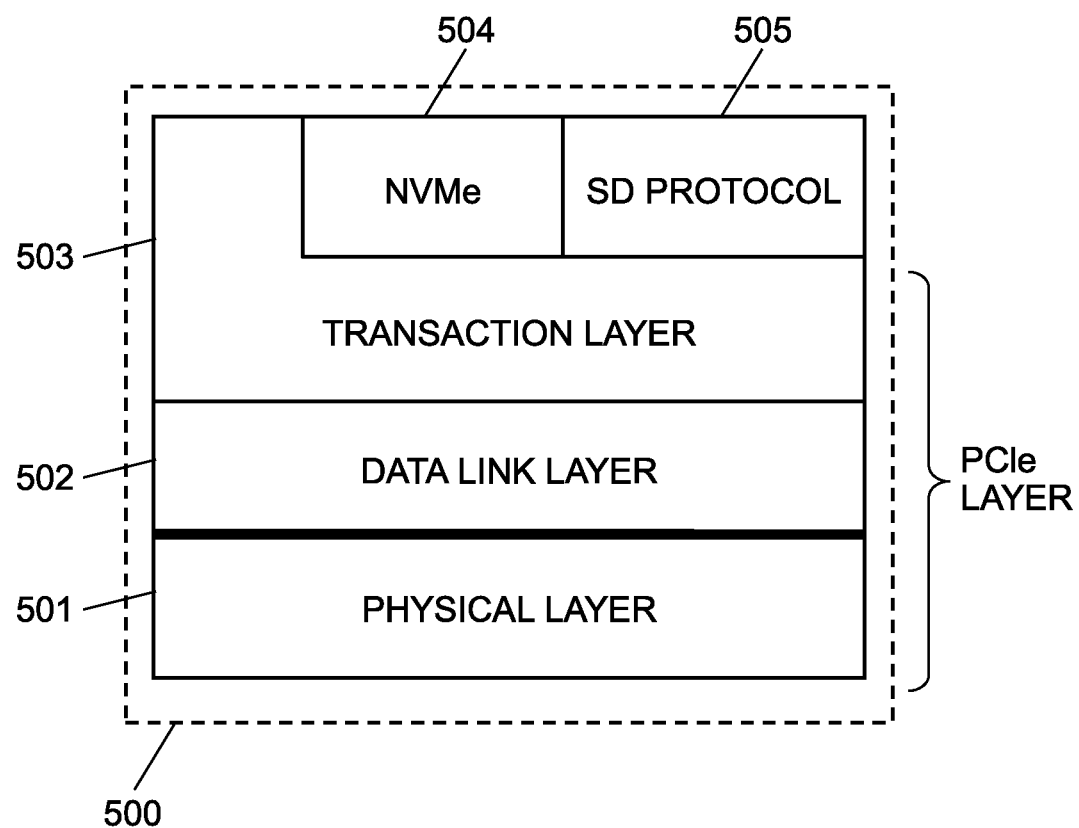
FIG. 5 illustrates a protocol stack.

FIG. 5 illustrates a protocol stack of a PCIe I/F. The protocol stack of a PCIe I/F is implemented on a card device. Protocol stack 500 includes physical layer 501, data link layer 502, transaction layer 503, Non-Volatile Memory Express (NVMe) 504, and SD protocol 505. Following operations are performed by a host device that has not been notified of whether or not a card device implements each of NVMe 504 and SD protocol 505.

Figure 6:
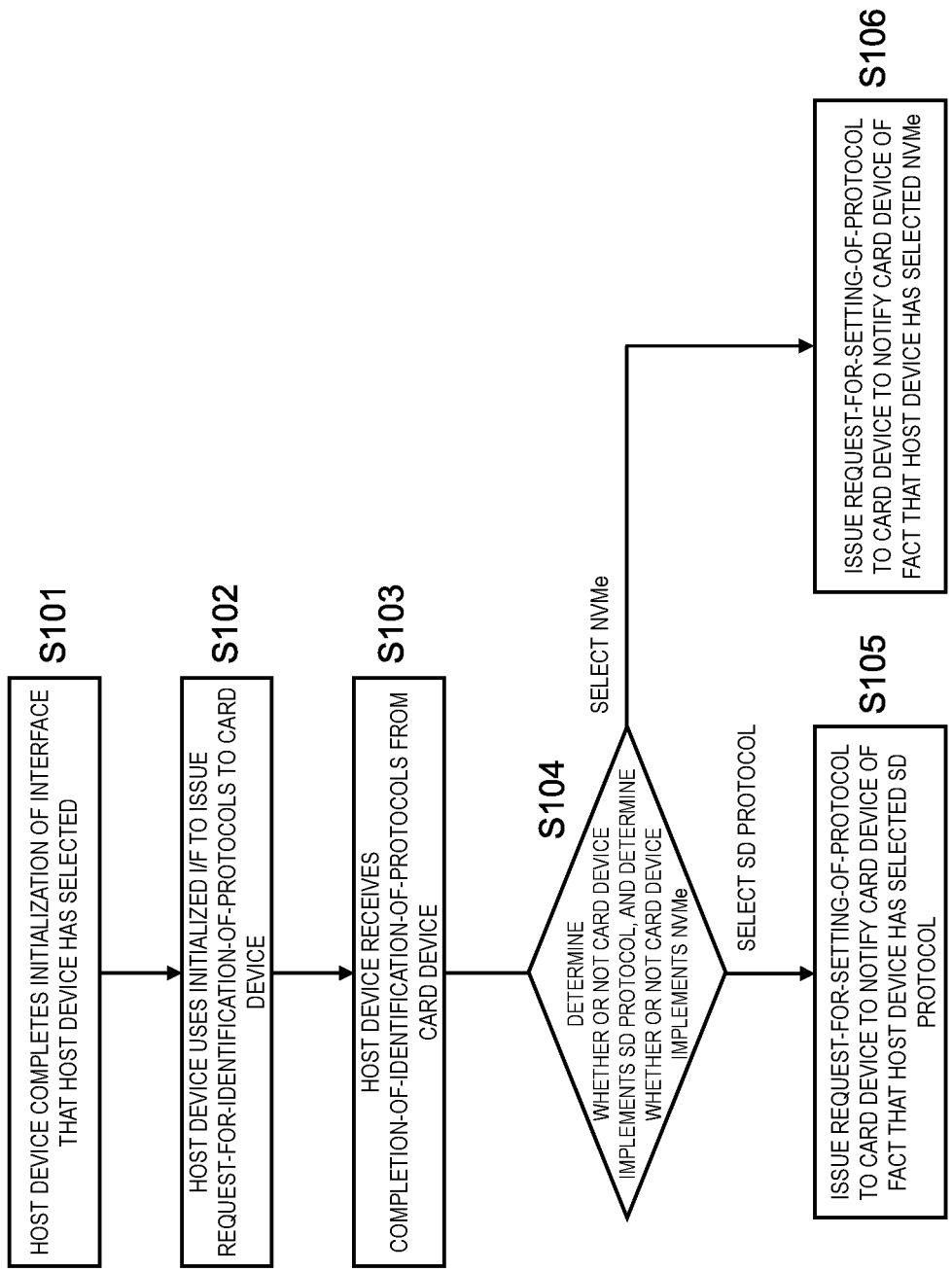
FIG. 6 is a flowchart that illustrates an example of a process of selection of a protocol stack according to a second exemplary embodiment.

FIG. 6 is a flowchart that illustrates an example of a process of selection of the protocol stack.

If the card device includes a PCIe I/F, the host device has completed initialization of the PCIe I/F (step S101). Therefore, the host device and the card device can transmit, to each other, transaction layer packets (TLPs) of a transaction layer. Further, the host device and the card device can receive, from each other, TLPs of the transaction layer.

In this state, the host device issues, to the card device, a request-for-identification-of-protocols (step S102) to ask the card device about kinds of protocols implemented on the card device. The request-for-identification-of-protocols is a kind of the TLPs.

Next, the host device receives, from the card device, completion-of-identification-of-protocols that corresponds to the request-for-identification-of-protocols (step S103). The completion-of-identification-of-protocols is a kind of the TLPs. The request-for-identification-of-protocols and the completion-of-identification-of-protocols will be described later.

Based on the completion-of-identification-of-protocols that the host device has received, the host device determines whether or not the card device implements an SD protocol, and determines whether or not the card device implements NVMe (step S104). That is to say, completion-of-identification-of-protocols from the card device notifies the host device of kinds of protocols implemented on the card device. If the host device selects the SD protocol to operate the card device (selects the SD protocol in step S104), the host device issues a request-for-setting-of-protocol to the card device to notify the card device of a fact that the host device has selected the SD protocol to operate the card device (step S105).

On the other hand, if the card device implements NVMe, and the host device selects NVMe to operate the card device (selects NVMe in step S104), the host device issues the request-for-setting-of-protocol to the card device to notify the card device of a fact that the host device has selected NVMe to operate the card device (step S106). The request-for-setting-of-protocol will be described later.

If the host device has been preliminarily notified of protocols implemented by the card device, the host device does not perform steps S102 to S104, and the host device determines a most appropriate protocol and notifies the card of the most appropriate protocol.

If the host device does not notify the card device of a protocol that has been selected by the host device and will be operated, the card device may not receive other requests and commands. That is to say, the card device does not operate until the host device selects one of protocols implemented on the card device.

[2-2. Request-for-Identification-of-Protocols and Completion-of-Identification-of-Protocols]

Figure 7:
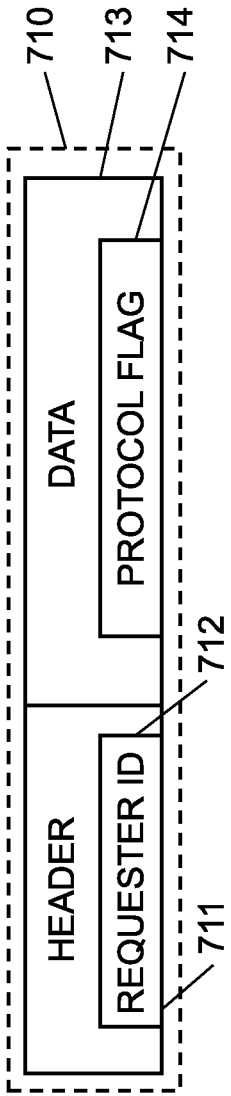
FIG. 7 illustrates a request-for-identification-of-protocols, and completion-of-identification-of-protocols according to the second exemplary embodiment.

FIG. 7 illustrates format-of-a-request-for-identification-of-protocols 700 and format-of-completion-of-identification-of-protocols 710.

Format-of-a-request-for-identification-of-protocols 700 contains header-of-a-request-for-identification-of-protocols 701. Header-of-a-request-for-identification-of-protocols 701 contains requester-ID-in-a-header-of-a-request-for-identification-of-protocols 702. Requester-ID-in-a-header-of-a-request-for-identification-of-protocols 702 represents a destination to which a request-for-identification-of-protocols is transmitted.

Format-of-completion-of-identification-of-protocols 710 contains header-of-completion-of-identification-of-protocols 711 and data-of-completion-of-identification-of-protocols 713. Header-of-completion-of-identification-of-protocols 711 contains requester-ID-in-a-header-of-completion-of-identification-of-protocols 712. Requester-ID-in-a-header-of-completion-of-identification-of-protocols 712 represents a destination to which completion-of-identification-of-protocols is transmitted. Data-of-completion-of-identification-of-protocols 713 contains protocol-flag-in-data-of-completion-of-identification-of-protocols 714. Protocol-flag-in-data-of-completion-of-identification-of-protocols 714 represents whether or not a card device stores each of an SD protocol and NVMe. For example, protocol-flag-in-data-of-completion-of-identification-of-protocols 714 has two bits, as illustrated in table 720 in FIG. 7 that illustrates an example of a protocol flag. A zero bit represents whether or not a card device implements NVMe. A first bit represents whether or not a card device implements an SD protocol. If protocol-flag-in-data-of-completion-of-identification-of-protocols 714 is "10", an SD card implements an SD protocol and does not implement an NVMe protocol.

[2-3. Request-for-Setting-of-Protocol]

Figure 8:
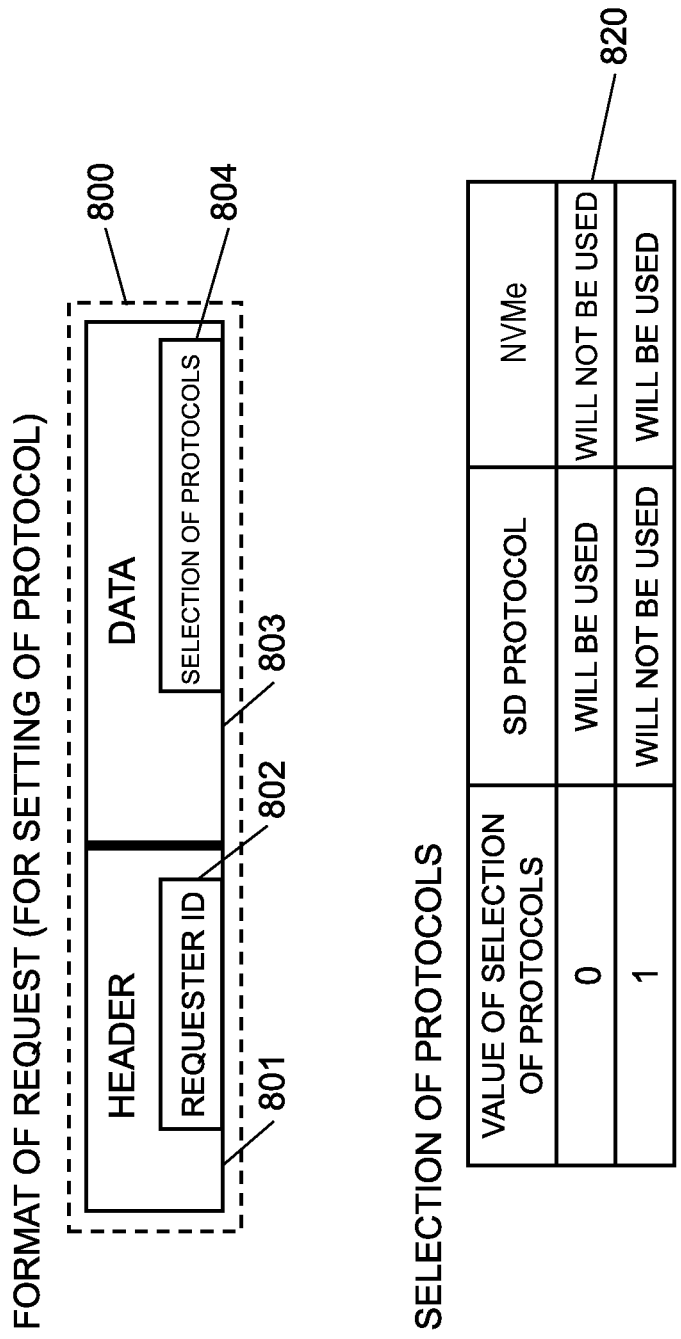
FIG. 8 illustrates a request-for-setting-of-protocol according to the second exemplary embodiment.

FIG. 8 illustrates a format-of-a-request-for-setting-of-protocol. Format-of-a-request-for-setting-of-protocol 800 contains header-of-a-request-for-setting-of-protocol 801 and data-of-a-request-for-setting-of-protocol 803. Header-of-a-request-for-setting-of-protocol 801 contains requester-ID-in-a-header-of-a-request-for-setting-of-protocol 802. Requester-ID-in-a-header-of-a-request-for-setting-of-protocol 802 represents a destination to which a request-for-setting-of-protocol is transmitted. Data-of-a-request-for-setting-of-protocol 803 contains selection-of-protocols-in-data-of-a-request-for-setting-of-protocol 804. Selection-of-protocols-in-data-of-a-request-for-setting-of-protocol 804 represents a protocol that has been selected from protocols implemented by a card device and will be used. For example, selection-of-protocols-in-data-of-a-request-for-setting-of-protocol 804 has one bit, as illustrated in table 820 in FIG. 8 that illustrates an example of selection of protocols. The bit whose value is "zero" means that an SD protocol will be used.

[2-4. Effects and Others]

In the present exemplary embodiment, a host device identifies procols stored on an interface that has been selected by the host device, as described above. The host device notifies a card device of a protocol that has been selected by the host device from the protocols stored in the card device and will be used by the host device. Consequently, the host device selects an appropriate protocol.

Third Exemplary Embodiment

[3-1. Operation]

FIG. 5 illustrates a protocol stack of a PCIe I/F. The protocol stack of a PCIe I/F is implemented on a card device. Protocol stack 500 includes physical layer 501, data link layer 502, transaction layer 503, Non-Volatile Memory Express (NVMe) 504, and SD protocol 505.

Following operations are performed by a host device that has not been notified of whether or not a card device that implements SD protocol 505 implements NVMe 504.

Figure 10:
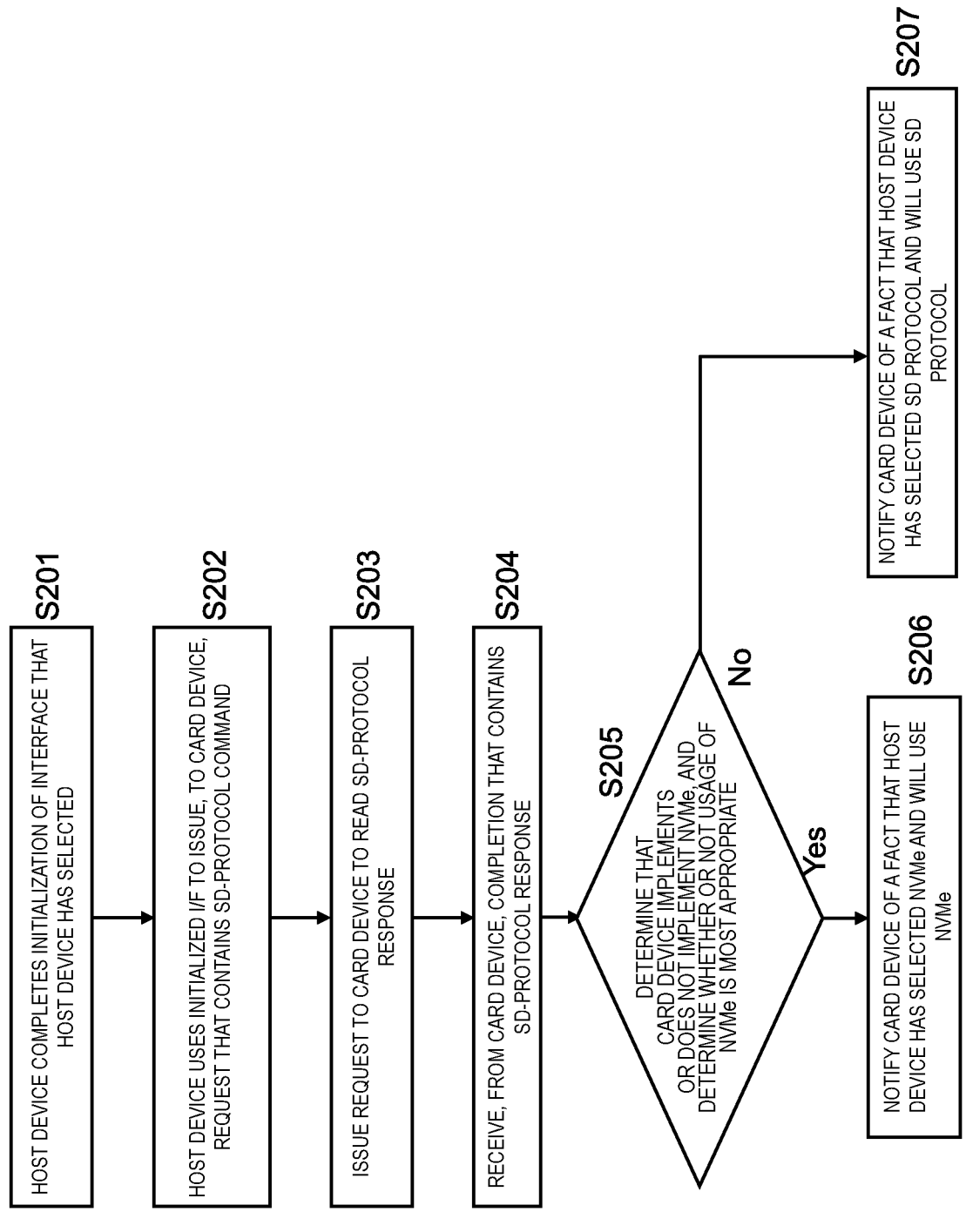
FIG. 10 is a flowchart that illustrates an example of a process of selection of a protocol stack at a time when an SD protocol is implemented, according to a third exemplary embodiment.

FIG. 10 is a flowchart that illustrates an example of a process of selection of a protocol stack.

If the card device includes the PCIe I/F, the host device has completed initialization of the PCIe I/F (step S201). Therefore, the host device and the card device can transmit, to each other, transaction layer packets (TLPs) of the transaction layer. Further, the host device and the card device can receive, from each other, TLPs of the transaction layer.

In this state, the host device issues, to the card device, a request-for-an-SD-command that contains an SD-protocol command in a data area of a TLP (step S202).

Next, the host device issues, to the card device, a request-for-an-SD-response to read an SD-protocol response (step S203).

The host device receives completion-of-an-SD-response from the card device (step S204). The completion-of-an-SD-response contains an SD-protocol response in a data area of a TLP. The SD-protocol response corresponds to the request-for-an-SD-response. The request-for-an-SD-command, the request-for-an-SD-response, and the completion-of-an-SD-response will be described later.

Based on the completion-of-an-SD-response that the host device has received, the host device determines that the card device implements or does not implement NVMe, and determines whether or not usage of NVMe is most appropriate (step S205). If the host device selects NVMe to operate the card device (Yes in step S205), the host device issues a request-for-setting-of-protocol to the card device to notify the card device of a fact that the host device has selected NVMe to operate the card device (step S206).

On the other hand, even if the host device selects the SD protocol to operate the card device (No in step S205), the host device issues a request-for-setting-of-protocol to the card device to notify the card device of a fact that the host device has selected the SD protocol to operate the card device (step S207). The request-for-setting-of-protocol will be described later.

[3-2. Request-for-an-SD-Command, Request-for-an-SD-Response, and Completion-of-an-SD-Response]

Figure 11:
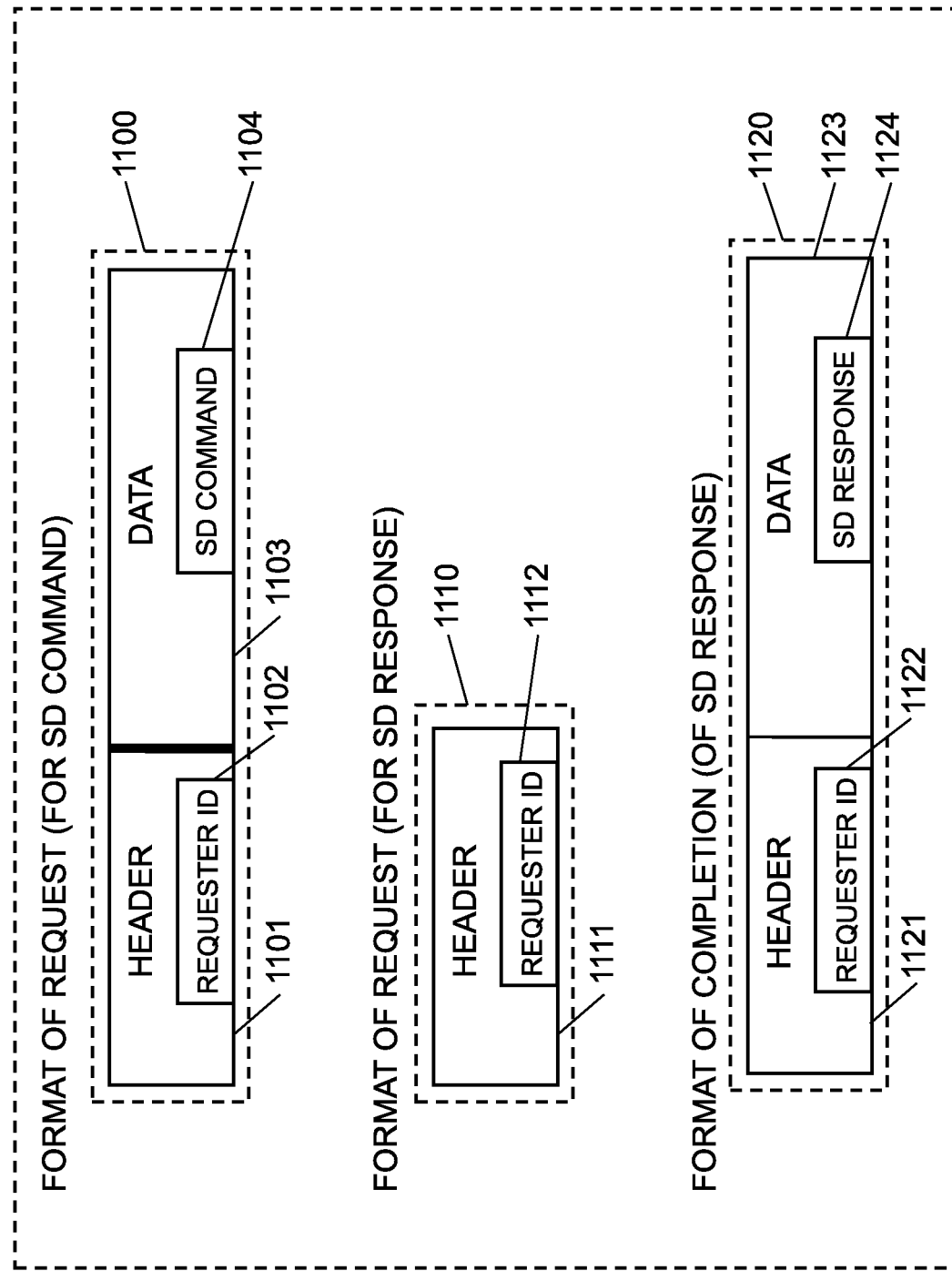
FIG. 11 illustrates a request-for-an-SD-protocol, and completion-of-an-SD-protocol according to the third exemplary embodiment.

FIG. 11 illustrates format-of-a-request-for-an-SD-command 1100, format-of-a-request-for-an-SD-response 1110, and format-of-completion-of-an-SD-response 1120.

Format-of-a-request-for-an-SD-command 1100 contains header-of-a-request-for-an-SD-command 1101 and data-of-a-request-for-an-SD-command 1103. Header-of-a-request-for-an-SD-command 1101 contains requester-ID-in-a-header-of-a-request-for-an-SD-command 1102. Requester-ID-in-a-header-of-a-request-for-an-SD-command 1102 represents a destination to which a request is transmitted. Data-of-a-request-for-an-SD-command 1103 contains SD-command-in-data-of-a-request-for-an-SD-command 1104. SD-command-in-data-of-a-request-for-an-SD-command 1104 is a sequence of bits defined in SD Specifications (SD Specifications Part 1 Physical Layer Specification).

Format-of-a-request-for-an-SD-response 1110 contains header-of-a-request-for-an-SD-response 1111. Header-of-a-request-for-an-SD-response 1111 contains requester-ID-in-a-header-of-a-request-for-an-SD-response 1112. Requester-ID-in-a-header-of-a-request-for-an-SD-response 1112 represents a destination to which a request is transmitted.

Format-of-completion-of-an-SD-response 1120 contains header-of-completion-of-an-SD-response 1121 and data-of-completion-of-an-SD-response 1123. Header-of-completion-of-an-SD-response 1121 contains requester-ID-in-a-header-of-completion-of-an-SD-response 1122. Requester-ID-in-a-header-of-completion-of-an-SD-response 1122 represents a destination to which a request is transmitted. Data-of-completion-of-an-SD-response 1123 contains SD-response-in-data-of-completion-of-an-SD-response 1124. SD-response-in-data-of-completion-of-an-SD-response 1124 is a sequence of bits that is defined in SD Specifications. An SD response contains a protocol flag. The SD response is contained in data of completion-of-an-SD-response. The completion-of-an-SD-response corresponds to a request-for-an-SD-command. The request-for-an-SD-command has been issued by the host device to identify protocols stored in the card device. As illustrated in FIG. 12, a protocol flag has one bit, for example. A protocol flag that is "zero" means that a card device does not implement NVMe. A protocol flag that is "one" means that a card device implements NVMe.

[3-3. Request-for-Setting-of-Protocol]

A format-of-a-request-for-setting-of-protocol is similar to the format-of-a-request-for-an-SD-command in FIG. 11. To set a protocol, a host device issues a request-for-an-SD-command to a card device. The request-for-an-SD-command contains SD-command-in-data-of-a-request-for-an-SD-command 1104. SD-command-in-data-of a-request-for-an-SD-command 1104 is a sequence of bits that is defined in the SD Specifications.

[3-4. Effects and Others]

In the present exemplary embodiment, a host device identifies procols stored on an interface that has been selected by the host device, as described above. The host device notifies a card device of a protocol that has been selected by the host device from the protocols stored in the card device and will be used by the host device. Consequently, the host device selects an appropriate protocol.

Fourth Exemplary Embodiment

[4-1. Operation]

Figure 13:
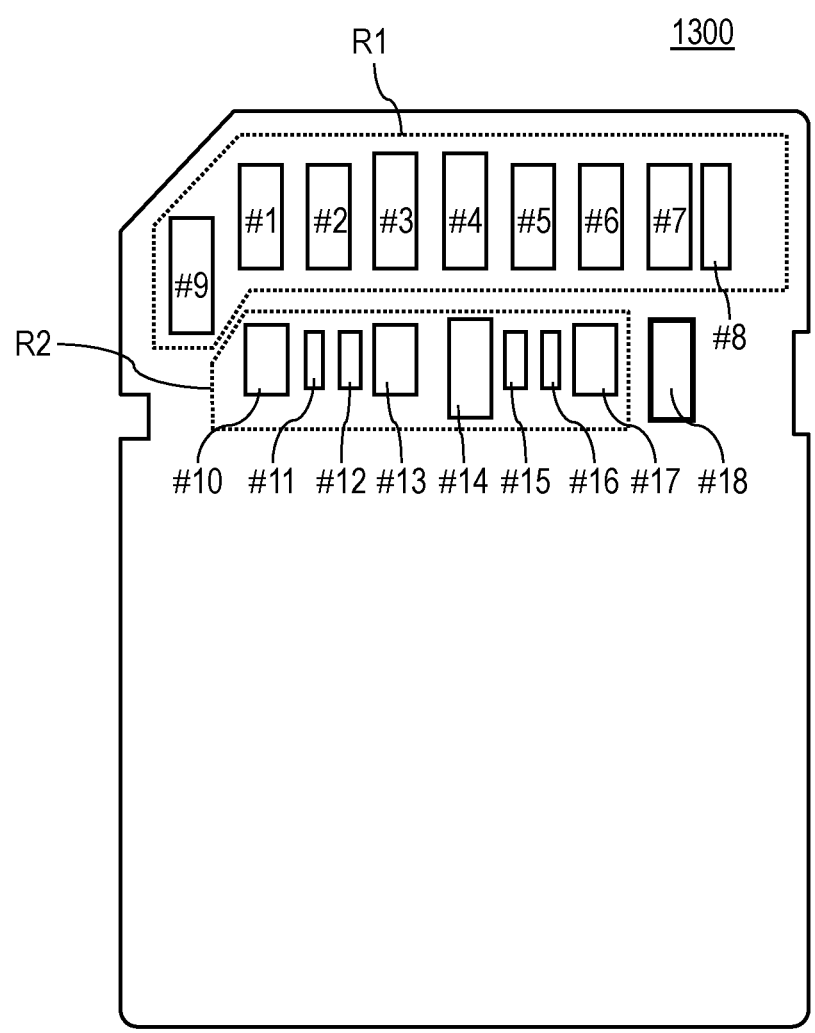
FIG. 13 illustrates an example of pin assignment of an interface of a card device.

FIG. 13 illustrates pin assignment of an interface of card device 1300. Card device 1300 is an SD card that is compatible with a standard of a legacy I/F and is compatible with a new interface. In the present exemplary embodiment, the new interface is a PCIe interface (hereinafter abbreviated to a PCIe I/F). Card device 1300 is card device 200 to which pin #18 is added. Card device 1300 uses pin #18 to receive supply-voltage VDD3 (1.2 V).

Figure 14:
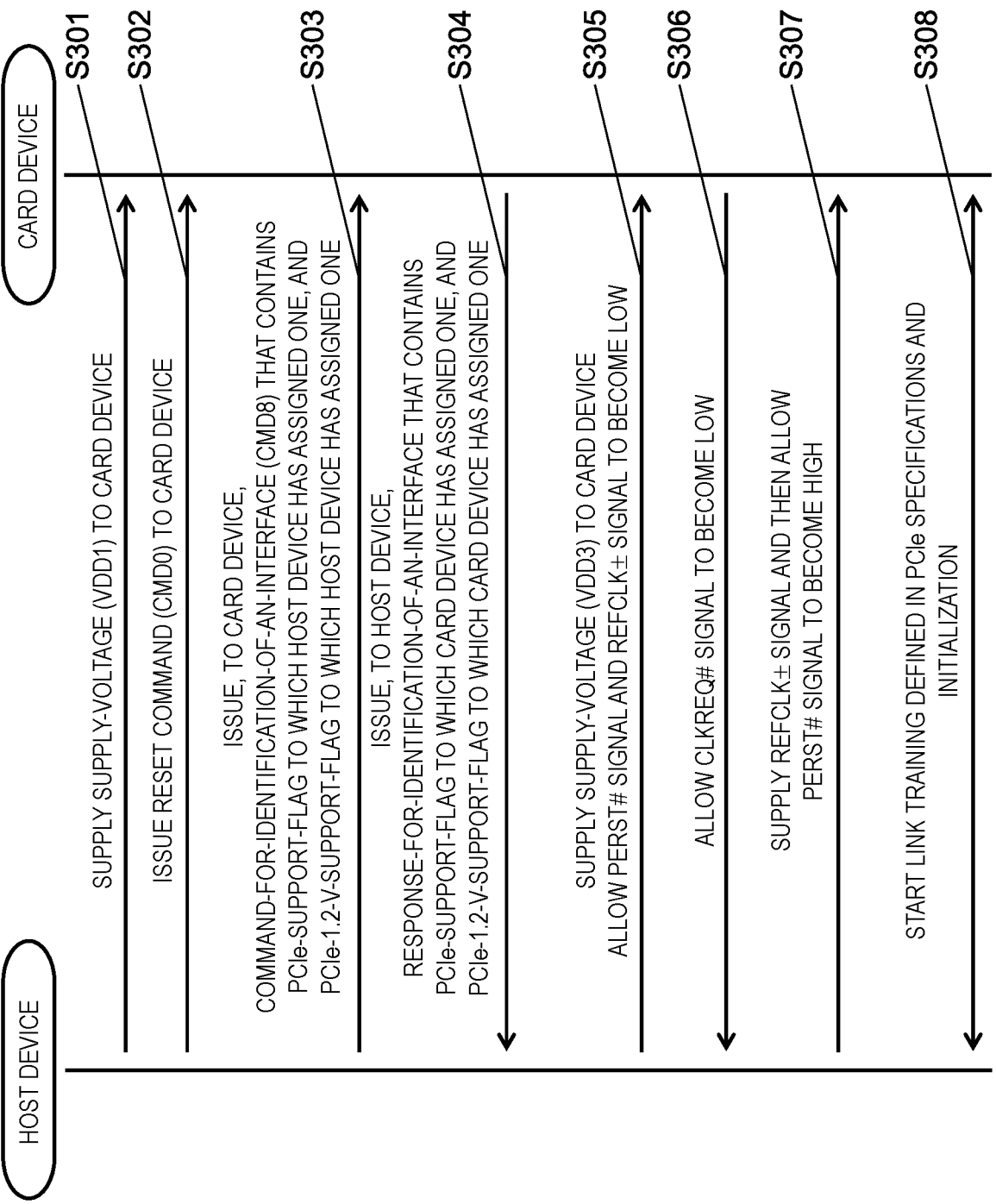
FIG. 14 is a sequence diagram that illustrates an example of a process of selection of interfaces according to a fourth exemplary embodiment.

FIG. 14 is a sequence diagram that illustrates an example of a process of selection of interfaces. The process of selection of interfaces is performed by a host device and a card device that are compatible with the PCIe I/F and supply-voltage VDD3 (1.2 V).

The host device detects the card device. Then the host device uses a pin of group-of-pins R1 to supply supply-voltage VDD1 (3.3 V) to the card device (step S301). Group-of-pins R1 includes pins #1 to #9. Even card device 100 or card device 200 that is not card device 1300 is able to receive supply-voltage VDD1 (3.3 V) since card device 100 and card device 200 each include the legacy I/F.

Next, the host device uses the legacy I/F to issue a reset command (CMD0) to the card device (step S302). Even card device 100 or card device 200 that is not card device 1300 is able to receive the reset command (CMD0) that is a command for a legacy I/F since card device 100 and card device 200 each include the legacy I/F.

Next, the host device uses the legacy I/F to issue a command-for-identification-of-an-interface (CMD8) to the card device to determine whether or not the card device includes a PCIe I/F and to determine whether or not the card device is compatible with supply-voltage VDD3 (1.2 V) (step S303). The command-for-identification-of-an-interface (CMD8) contains a PCIe-support-flag to which the host device has assigned one, and a PCIe-1.2-V-support-flag to which the host device has assigned one.

Card device 1300 uses the legacy I/F to receive the command-for-identification-of-an-interface (CMD8). Card device 1300 issues a response-for-identification-of-an-interface to the host device. The response-for-identification-of-an-interface corresponds to the command-for-identification-of-an-interface. The response-for-identification-of-an-interface contains a PCIe-support-flag to which card device 1300 has assigned one and a PCIe-1.2-V-support-flag to which card device 1300 has assigned one since card device 1300 includes a PCIe I/F and is compatible with supply-voltage VDD3 (1.2 V) (step S304). The command-for-identification-of-an-interface and the response-for-identification-of-an-interface will be described later.

Next, the host device determines that one has been assigned to the PCIe-support-flag, based on the response-for-identification-of-an-interface. To start initialization of the PCIe I/F, the host device allows a PERST # signal and a REFCLK± signal to become "LOW". The PERST # signal and the REFCLK±signal have been assigned to one of pins #1 to #17. Further, the host device determines that one has been assigned to the PCIe-1.2-V-support-flag, based on the response-for-identification-of-an-interface. Then the host device supplies supply-voltage VDD3 (1.2 V) to pin #18 (step S305).

When card device 1300 determines that card device 1300 has received supply-voltage VDD3 (1.2 V) through pin #18, card device 1300 allows a CLKREQ # signal to become "LOW". The CLKREQ # signal has been assigned to one of pins #1 to #17 (step S306).

When the host device detects CLKREQ # signal transmitted from card device 1300, the host device supplies an REFCLK±signal and then allows the PERST # signal to become "HIGH" (step S307).

Then the host device performs link training defined in PCIe specifications to start initialization of the PCIe I/F (step S308).

Figure 15:
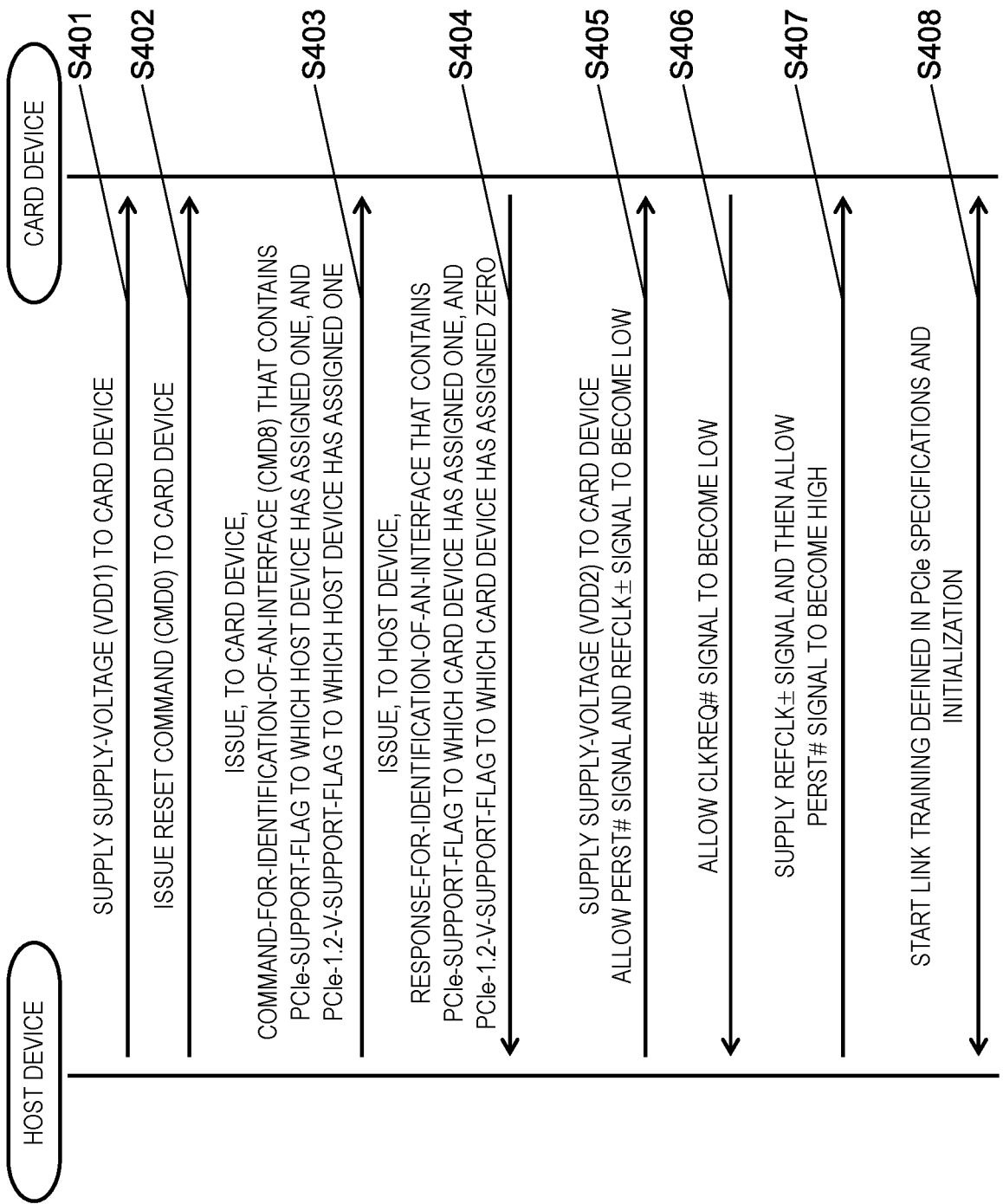
FIG. 15 is a sequence diagram that illustrates an example of a process of selection of interfaces according to the fourth exemplary embodiment.

FIG. 15 is a sequence diagram that illustrates an example of a process of selection of interfaces. The process of selection of interfaces is performed by a host device that is compatible with a PCIe I/F and supply-voltage VDD3 (1.2 V) and a card device that is compatible with the PCIe I/F and is not compatible with supply-voltage VDD3 (1.2 V). A difference between FIG. 15 and FIG. 14 is that the card device transmits, to the host device, a response-for-identification-of-an-interface that contains a PCIe-1.2-V-support-flag to which the card device has assigned zero (step S404). Another difference between FIG. 15 and FIG. 14 is that the host device determines that zero has been assigned to the PCIe-1.2-V-support-flag, and then the host device uses one pin of group-of-pins R2 to supply supply-voltage VDD2 (1.8 V) to the card device (step S405). Group-of-pins R2 includes pins #10 to #17.

Figure 16:
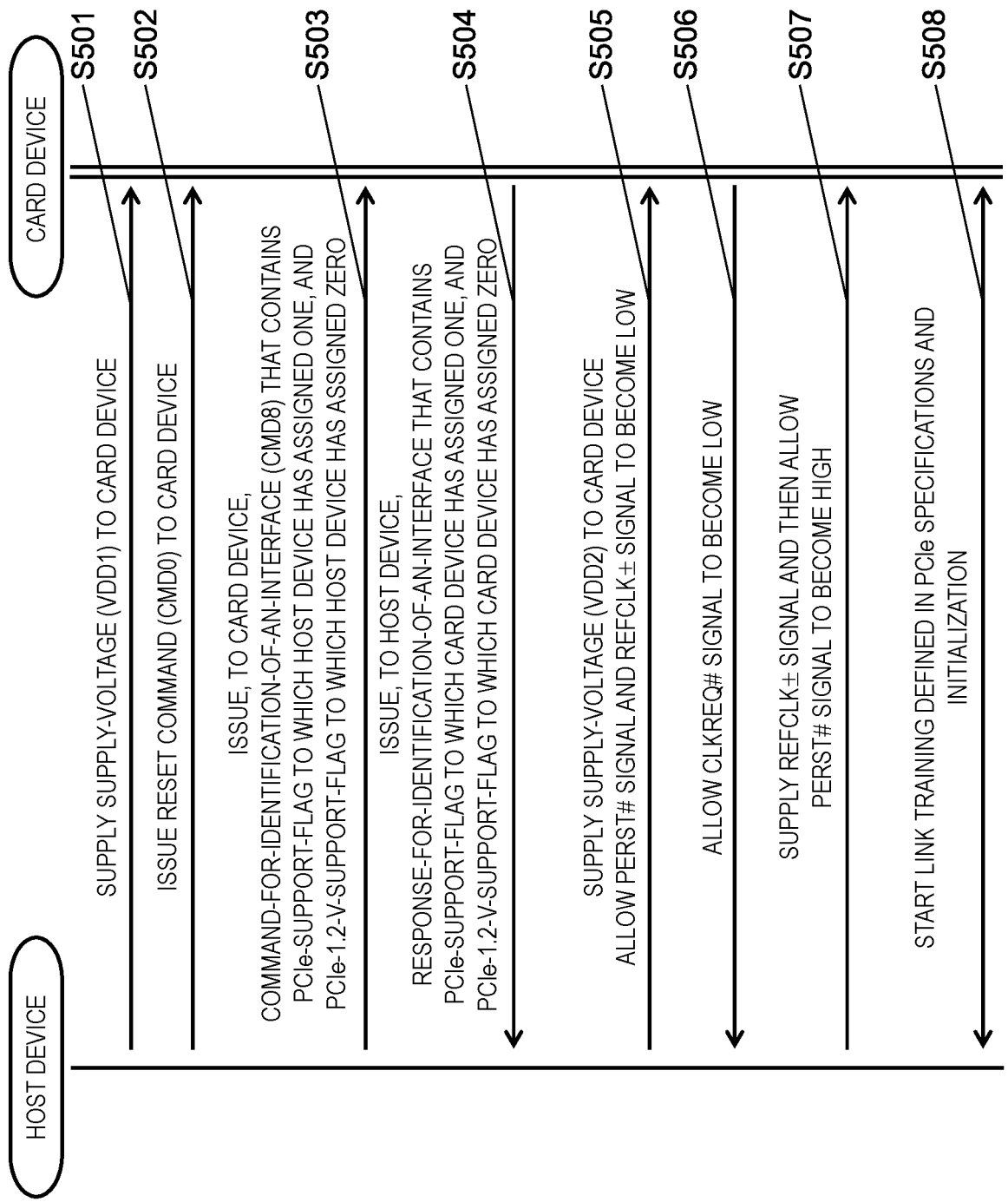
FIG. 16 is a sequence diagram that illustrates an example of the process of selection of interfaces according to the fourth exemplary embodiment.

FIG. 16 is a sequence diagram that illustrates an example of a process of selection of interfaces. The process of selection of interfaces is performed by a host device that is compatible with a PCIe I/F and is not compatible with supply-voltage VDD3 (1.2 V) and a card device that is compatible with the PCIe I/F. A difference between FIG. 16 and FIG. 14 is that the host device transmits, to the card device, a command-for-identification-of-an-interface that contains a PCIe-1.2-V-support-flag to which the host device has assigned zero (step S503). Another difference between FIG. 16 and FIG. 14 is that the card device determines that zero has been assigned to the PCIe-1.2-V-support-flag, and then the card device issues, to the host device, a response-for-identification-of-an-interface that contains a PCIe-1.2-V-support-flag to which the card device has assigned zero although the card device is compatible with PCIe-1.2-V (step S504). Another difference between FIG. 16 and FIG. 14 is that the host device uses one pin of group-of-pins R2 to supply supply-voltage VDD2 (1.8 V) to the card device (step S505). Group-of-pins R2 includes pins #10 to #17.

[4-2. Command-for-Identification-of-Interface and Response-for-Identification-of-Interface]

FIG. 17 illustrates format-of-a-command-for-identification-of-an-interface 1700 and format-of-a-response-for-identification-of-an-interface 1710.

Format-of-a-command-for-identification-of-an-interface 1700 includes index-of-a-command-for-identification-of-an-interface 1701 and argument-of-a-command-for-identification-of-an-interface 1702. A card device uses index-of-a-command-for-identification-of-an-interface 1701 to determine whether or not a command issued by a host device is a command-for-identification-of-an-interface.

Argument-of-a-command-for-identification-of-an-interface 1702 contains PCIe-1.2-V-support-flag-in-a-command-for-identification-of-an-interface 1703 and PCIe-support-flag-in-a-command-for-identification-of-an-interface 1704. If a host device asks a card device whether or not the card device is compatible with supply-voltage VDD3 (1.2 V), the host device assigns "one" to PCIe-1.2-V-support-flag-in-a- command-for-identification-of-an-interface 1703. Alternatively, if a host device does not ask a card device whether or not the card device is compatible with supply-voltage VDD3 (1.2 V), the host device assigns "zero" to PCIe-1.2-V-support-flag-in-a-command-for-identification-of-an-interface 1703. If a host device asks a card device whether or not the card device is compatible with a PCIe I/F, the host device assigns "one" to PCIe-support-flag-in-a-command-for-identification-of-an-interface 1704. Alternatively, if a host device does not ask a card device whether or not the card device is compatible with a PCIe I/F, the host device assigns "zero" to PCIe-support-flag-in-a-command-for-identification-of-an-interface 1704.

Format-of-a-response-for-identification-of-an-interface 1710 includes index-of-a-response-for-identification-of-an-interface 1711 and argument-of-a-response-for-identification-of-an-interface 1712. A card device transmits, to a host device, index-of-a-response-for-identification-of-an-interface 1711 that has a value that is equal to a value of index-of-a-command-for-identification-of-an-interface 1701 contained in a command-for-identification-of-an-interface. The host device uses index-of-a-response-for-identification-of-an-interface 1711 to determine whether or not a response transmitted from the card device is a response-for-identification-of-an-interface.

Argument-of-a-response-for-identification-of-an-interface 1712 contains PCIe-1.2-V-support-flag-in-a-response-for-identification-of-an-interface 1713 and PCIe-support-flag-in-a-response-for-identification-of-an-interface 1714. If a host device has asked a card device whether or not the card device is compatible with supply-voltage VDD3 (1.2 V), and if the card device is compatible with supply-voltage VDD3 (1.2 V), the card device assigns "one" to PCIe-1.2-V-support-flag-in-a-response-for-identification-of-an-interface 1713. Alternatively, if a host device has not asked a card device whether or not the card device is compatible with supply-voltage VDD3 (1.2 V), or if the card device is not compatible with supply-voltage VDD3 (1.2 V), the card device assigns "zero" to PCIe-1.2-V-support-flag-in-a-response-for-identification-of-an-interface 1713. If a host device has asked a card device whether or not the card device is compatible with a PCIe IT, and if the card device is compatible with the PCIe IT, the card device assigns "one" to PCIe-support-flag-in-a-response-for-identification-of-an-interface 1714. Alternatively, if a host device has not asked a card device whether or not the card device is compatible with a PCIe IT, or the card device is not compatible with a PCIe IT, the card device assigns "zero" to PCIe-support-flag-in-a-response-for-identification-of-an-interface 1714.

If a host device has asked a card device whether or not the card device is compatible with supply-voltage VDD3 (1.2 V), and if the card device is compatible with supply-voltage VDD3 (1.2 V), and if the card device is compatible with a PCIe I/F, the card device may assign "one" to PCIe-1.2-V-support-flag-in-a-response-for-identification-of-an-interface 1713. Alternatively, if a host device has not asked a card device whether or not the card device is compatible with supply-voltage VDD3 (1.2 V), or if the card device is not compatible with supply-voltage VDD3 (1.2 V), or if the card device is not compatible with the PCIe I/F, the card device may assign "zero" to PCIe-1.2-V-support-flag-in-a-response-for-identification-of-an-interface 1713.

[4-3. Effects and Others]

In the present exemplary embodiment, a host device uses a legacy I/F that is a conventional I/F to identify an interface of a card device that has been inserted into the host device, as described above. Consequently, the host device can select an appropriate interface.

Other Exemplary Embodiments

The first to fourth exemplary embodiments have been described above to exemplify techniques disclosed in the present application. However, the techniques of the present disclosure are not limited to the first to fourth exemplary embodiments. The first to fourth exemplary embodiments may be modified. Alternatively, one or some components of the first to fourth exemplary embodiments may be replaced by other component(s). Alternatively, one or some components may be added to the first to fourth exemplary embodiments. Alternatively, one or some components may be eliminated from the first to fourth exemplary embodiments. The techniques of the present disclosure are applicable to such exemplary embodiments. In another example of the third exemplary embodiment, a card device that includes a PCIe I/F may output a response of a conventional SD card. Further, components described in the first to fourth exemplary embodiments may be combined to make new exemplary embodiments.

The first to fourth exemplary embodiments exemplify techniques of the present disclosure. Therefore, the first to fourth exemplary embodiments may be variously modified within a scope of the claims or a scope of equivalents of the claims. Alternatively, one or some components of the first to fourth exemplary embodiments may be replaced by other component(s), within a scope of the claims or a scope of equivalents of the claims. Alternatively, one or some components may be added to the first to fourth exemplary embodiments, within a scope of the claims or a scope of equivalents of the claims. Alternatively, one or some components may be eliminated from the first to fourth exemplary embodiments, within a scope of the claims or a scope of equivalents of the claims.

INDUSTRIAL APPLICABILITY

The present disclosure is appropriately used for a card device and a host device that support an interface that is newly introduced into the card device. Further, the present disclosure is appropriately used for a card device and a host device that implement a plurality of protocols.

What is claimed is:

1. A card device comprising a first interface that connects the card device with a host device,
wherein the card device notifies, through the first interface, the host device whether or not the card device includes a second interface different from the first interface, and
wherein after the card device is supplied a first voltage from the host device through one of terminals that constitute the first interface, the card device receives, from the host device through the first interface, an inquiry on whether or not the card device includes the second interface, and on whether or not the second interface supports a second voltage different from the first voltage,
the card device notifies, through the first interface, the host device of an answer to the inquiry, and
when the answer is to an effect that the card device includes the second interface, and the second interface does not support the second voltage, after the card device is supplied a third voltage different from both the first voltage and the second voltage from the host device, the card device sets a signal of one of terminals that constitute the first interface to "LOW", and the card device allows the host device to initialize the second interface through the second interface.

2. The card device according to claim 1, wherein, when the card device includes the second interface, the card device notifies the host device of a kind of the second interface, in addition to whether or not the card device includes the second interface.

3. The card device according to claim 1, wherein the card device does not allow the host device to initialize the second interface until the card device notifies the host device of whether or not the card device includes the second interface.

4. The card device according to claim 1, wherein the first interface is a legacy interface in secured digital (SD) card standard, and the second interface is a Peripheral Component Interconnect Express (PCIe) interface.

5. The card device according to claim 1, wherein after the host device initializes at least one of the first interface and the second interface, the card device notifies the host device of a kind of a protocol implemented on the card device.

6. The card device according to claim 1, wherein the card device does not operate until a protocol implemented on the card device is selected by the host device.

7. A host device comprising a first interface that connects the host device with a card device,
wherein the host device asks, through the first interface, the card device whether or not the card device includes a second interface different from the first interface, and
wherein after the host device supplies a first voltage to the card device through one of terminals that constitute the first interface, the host device transmits, to the card device through the first interface, an inquiry on whether or not the card device includes the second interface, and on whether or not the second interface supports a second voltage different from the first voltage,
when an answer from the card device to the inquiry is to an effect that the card device includes the second interface, and the second interface does not support the second voltage, the host device supplies the card device with a third voltage different from both the first voltage and the second voltage, and sets a signal of another one of terminals that constitute the first interface to "LOW", and
after the host device detects a notifying that the card device has received supply of the third voltage, the host device sets the signal of the other one of terminals to "HIGH" from "LOW".

8. The host device according to claim 7, wherein the host device asks the card device about a kind of the second interface when the host device asks the card device whether or not the card device includes the second interface.

9. The host device according to claim 7, wherein the first interface is a legacy interface in secured digital (SD) card standard, and the second interface is a Peripheral Component Interconnect Express (PCIe) interface.

10. The host device according to claim 7, wherein after the host device initializes at least one of the first interface and the second interface, the host device asks the card device about a kind of a protocol implemented on the card device.

* * * * *